United States Patent
Suvanto

(10) Patent No.: US 10,006,996 B2
(45) Date of Patent: Jun. 26, 2018

(54) ECHOLOCATION APPARATUS

(75) Inventor: Mikko Veli Aimo Suvanto, Wilkinsburg, PA (US)

(73) Assignee: Nokia Technologies Oy, Espoo (FI)

(*) Notice: Subject to any disclaimer, the term of this patent is extended or adjusted under 35 U.S.C. 154(b) by 527 days.

(21) Appl. No.: 14/002,218

(22) PCT Filed: Mar. 14, 2011

(86) PCT No.: PCT/IB2011/051066
§ 371 (c)(1),
(2), (4) Date: Aug. 29, 2013

(87) PCT Pub. No.: WO2012/123787
PCT Pub. Date: Sep. 20, 2012

(65) Prior Publication Data
US 2013/0336093 A1  Dec. 19, 2013

(51) Int. Cl.
*G01S 15/08* (2006.01)
*G01S 15/06* (2006.01)
*G01S 7/54* (2006.01)
*G01S 15/87* (2006.01)

(52) U.S. Cl.
CPC ............ *G01S 15/08* (2013.01); *G01S 7/54* (2013.01); *G01S 15/06* (2013.01); *G01S 15/87* (2013.01)

(58) Field of Classification Search
CPC . G01S 15/06; G01S 15/08; G01S 7/54; G01S 15/87
USPC ..... 367/99, 107, 89, 100, 103, 87, 101, 105, 367/118, 131, 159, 173, 178, 4, 7, 93, 96; 342/118, 124, 146, 147, 22, 70; 381/190; 340/10.1, 5.1, 686.1; 341/176; 702/150, 702/155, 55; 707/609, 722, 769
See application file for complete search history.

(56) References Cited

U.S. PATENT DOCUMENTS

| 4,581,726 A * | 4/1986 | Makino ............... G01S 7/52004 267/99 |
| 6,542,436 B1 * | 4/2003 | Myllyla ................. G01S 7/527 340/686.6 |
| 2005/0037730 A1 * | 2/2005 | Montague ........... B60R 25/1004 455/404.2 |

(Continued)

FOREIGN PATENT DOCUMENTS

| CN | 201153276 Y | 11/2011 |
| JP | 2003240850 | 8/2003 |

(Continued)

OTHER PUBLICATIONS

International Search Report received for corresponding Patent Cooperation Treaty Application No. PCT/IB2011/051066, dated Nov. 21, 2011, 4 pages.

(Continued)

*Primary Examiner* — Isam A Alsomiri
*Assistant Examiner* — Amie M Ndure
(74) *Attorney, Agent, or Firm* — Alston & Bird LLP

(57) ABSTRACT

An apparatus comprises an echolocation module configured to determine a distance to the object based on the received sound signal reflected from an object. The echolocation module determines surroundings based on the determined distance. A processor is configured to modify one or more attributes of the apparatus based on the determined surroundings.

22 Claims, 6 Drawing Sheets

(56) References Cited

U.S. PATENT DOCUMENTS

| | | | |
|---|---|---|---|
| 2005/0046584 A1* | 3/2005 | Breed | B60C 11/24 340/13.31 |
| 2006/0208169 A1* | 9/2006 | Breed | B60N 2/002 250/221 |
| 2006/0291667 A1* | 12/2006 | Watanabe | H04R 1/323 381/77 |
| 2008/0036580 A1* | 2/2008 | Breed | B60R 21/01536 340/438 |
| 2008/0236275 A1* | 10/2008 | Breed | B60C 11/24 73/290 V |
| 2008/0292115 A1 | 11/2008 | Ding et al. | |
| 2009/0092284 A1* | 4/2009 | Breed | B60J 10/00 382/103 |
| 2009/0124231 A1* | 5/2009 | Kroll | H04M 1/677 455/404.1 |
| 2010/0034363 A1* | 2/2010 | O'Connell | H04M 1/656 379/88.23 |
| 2010/0141518 A1* | 6/2010 | Hersey | G01C 13/008 342/357.64 |
| 2012/0087212 A1* | 4/2012 | Vartanian | G01S 15/08 367/118 |

FOREIGN PATENT DOCUMENTS

| | | |
|---|---|---|
| WO | 2007084122 | 7/2007 |
| WO | 2011001405 | 1/2011 |

OTHER PUBLICATIONS

International Written Opinion for corresponding International Application No. PCT/IB2011/051066, dated Nov. 21, 2011.

* cited by examiner

ECHOLOCATION APPARATUS

RELATED APPLICATION

This application was originally filed as PCT Application No. PCT/IB2011/051066 filed Mar. 14, 2011.

FIELD

The present application relates to a method and apparatus for echolocation for an electronic device. In some embodiments the method and apparatus relate to ultrasonic echolocation for an electronic device for determining the surroundings of the electronic device.

BACKGROUND

Mobile devices such as smartphones are ever more focussed on providing increased connectivity for a user. For example, many mobile devices can access data networks, deliver email, and provide instant messaging, to name a few available features. Many users value the ability of mobile devices to retrieve documents, messages and other information on the move.

However some users have found that more connectivity can increase the amount of information received by their mobile device which can be inconvenient at times. For example, the mobile device can notify a user about a new email but the user may not have sufficient time to properly deal with the new email. Nevertheless, even though a user may be doing something else the user may feel compelled to read the email in response to the notification. The distracted user may read the email whilst being preoccupied with other tasks but then forget later to react to the email.

Other users have found that the increased amount of information received by the mobile device can provide an unacceptable level of notifications which can distract a user from other tasks. Turning off the mobile device may not be an option for some users because they may need the ability to receive important phone calls or important messages. Another option is operating the mobile device in a silent mode. However, it has been noted that some users can still be inconveniently distracted by silent notifications such as a vibration alert or a change in colour of a flashing light on the electronic device.

One known solution has been to use location information of the mobile device to change the behaviour of the mobile device. For example, the mobile device can determine that it is in transit based on the location information and modify the behaviour of the mobile device. However, in some circumstances users may not wish to be disturbed by the mobile device even if they are no longer in transit. A user may wish to hold a conversation with someone else in person without being distracted by notifications generated by the mobile device.

Alternatively, the mobile device can determine that the user is at a train station from location information. The user, however, may not wish to receive notifications when the user is waiting at a train platform and in very close proximity to other passengers.

Embodiments of the invention aim to address one or several of the above issues.

In accordance with an embodiment there is provided an acoustic transducer comprising; a sound generator configured to operate in an first mode for generating audible sounds and to operate in a second mode for generating ultrasonic sounds.

The sound generator is configured to operate in the first and second modes at the same time. Alternatively the sound generator is configured to operate in the first and second modes at different times. This means that a single sound transmitter can be used to generate both audio and ultrasound signals, which can be generated at the same time or a different times.

In accordance with another embodiment there is an acoustic transducer comprising: a sound detector configured to detect audible sounds in a first mode and to detect ultrasonic sounds in a second mode.

The sound detector is configured to operate in the first and second modes at the same time. Alternatively the sound detector is configured to operate in the first and second modes at different times. This means a single sound receiver can be used to detect both ultrasound and audio signals.

The transducer can be a microphone module. The acoustic transducer can be a microelectromechanical system. The ultrasonic sounds have a frequency of above 20 KHz.

In accordance with an embodiment there is an acoustic transducer comprising: a sound generator configured to operate in an first mode for generating audible sounds and to operate in a second mode for generating ultrasonic sounds; and a sound detector configured to detect audible sounds in a first mode and to detect ultrasonic sounds in a second mode. In this way the acoustic transducer can operate both as a transmitter and a receiver. This can save space and complexity of manufacture of a electronic device using the transducer.

In accordance with an embodiment there is an electronic device comprising one or more above mentioned acoustic transducers. The electronic device can be a mobile phone.

In accordance with an embodiment there is a headset comprising one or more above mentioned acoustic transducers. The headset can be wirelessly or wire connected with the electronic device. The headset can send and receive sound signals in different directions in addition to or alternatively to the electronic device. The headset can send and receive sound signals along a different direction, if for example, the transducers on the electronic device are obscured.

In accordance with an embodiment there is a method comprising: generating an audible sound signal in a first mode; and generating an ultrasonic sound signal in a second mode.

The first and second modes can occur at the same time or the first and second modes can occur at different times.

In accordance with an embodiment there is a method comprising: detecting audible sounds in a first mode; and detecting ultrasonic sounds in a second mode.

The first and second modes can occur at the same time or the first and second modes can occur at different times.

The ultrasonic sounds can have a frequency of above 20 KHz.

In accordance with an embodiment there is an apparatus comprising: means for generating an audible sound signal in a first mode and generating an ultrasonic sound signal in a second mode.

In accordance with an embodiment there is an apparatus comprising: means for detecting an audible sound signal in a first mode and detecting an ultrasonic sound signal in a second mode.

In accordance with an embodiment there is a method comprising: determining a distance to the object based on the received sound signal reflected from an object; determining surroundings based on the determined distance; and modifying one or more attributes of an electronic device based on the determined surroundings. The method performs echolocation and on determining a distance to an object from the echolocation, the environmental surroundings can be determined and the electronic device altered accordingly. Determining the surroundings can be determining the type of surroundings, such as whether the electronic device is in a building or vehicle. The determining the surroundings can be determining the type of surroundings or a particular known surroundings. Modifying attributes/functionality of the electronic device can allow the user to continue using the electronic device but not have to be distracted by the electronic device at inconvenient times.

The method can comprises receiving the sound signal reflected from the object. The method comprises sending a sound signal towards the object.

The acoustic transducer sending the sound signal can be separate from the electronic device.

The sound signal is an ultrasound signal which means that the ultrasound signal may not interfere with audio signals. Additionally an ultrasound signal can provide additional resolution over audible sound signals used in echolocation.

The method can comprise receiving sensor information and determining the surroundings based on the received sensor information and the determined distance. The surroundings can be better determined with additional information received about the surroundings. The received sensor information can be any of the following: global positioning system information; temperature information, power signal information, battery signal information, acceleration information, vibration information, brightness information, data usage information, call usage information, compass information, gyroscopic information or any other sensor information.

The method can comprise comparing the determined distance information with stored distance information. The determined distance information can be compared against known location and distance information. The stored information can be a information associated with preferred or likely locations in which the electronic device might be.

The method can comprises determining that the determined distance information matches with the stored distance information and retrieving surrounding information associated with the stored distance information. This means the behaviour of the electronic device can be modified depending on the determined location of the electronic device.

The method can comprises receiving sound signals in a plurality of directions and determining the distance to a plurality of objects. The echolocation can be performed in a plurality of directions to ascertain greater spatial information of the electronic device with respect to its locality.

The method can comprise storing distance information and/or sensor information associated with a particular surroundings. In this way the electronic device can be trained to learn about the particular surroundings.

The method can comprise storing modifying information associated with the particular surroundings for modifying the electronic device when the electronic device is at the particular surroundings.

The modifying the attributes of the electronic device can comprise modifying when the electronic device generates notifications. The notifications can be associated with one or more of the following calls, emails, SMS messages, MMS messages, alarms or any other communication event.

A computer program comprising program code means adapted to perform the method may also be provided.

In accordance with an embodiment there is an apparatus comprising: an echolocation module configured to determine a distance to the object based on the received sound signal reflected from an object; and determine surroundings based on the determined distance; and a processor configured to modify one or more attributes of the apparatus based on the determined surroundings.

The apparatus can comprise one or more acoustic transducers configured to receive the sound signal reflected from the object.

The apparatus can comprise one or more transducers configured to send a sound signal towards the object.

The acoustic transducers can be configured to send and/or receive an ultrasonic sound signal.

The apparatus can comprise one or more sensors configured to send information to the echolocation module for determining the surroundings based on the received sensor information and the determined distance.

The one or more sensors information can be any of the following: global positioning system sensor; temperature sensor, power signal sensor, battery signal sensor, acceleration sensor, vibration sensor, brightness sensor, data usage sensor, call usage sensor, compass sensor, gyroscopic sensor, near field communication sensor or any other sensor.

The echolocation module can be configured to compare the determined distance information with distance information stored in memory.

The echolocation module can be configured to determine that the determined distance information matches with the stored distance information and retrieve surrounding information associated with the stored distance information.

The apparatus can comprise a plurality of acoustic transducers for receiving and sending sound signals to a plurality of objects. The plurality of acoustic transducers can be located on different faces of the apparatus.

The processor can be configured to modify when the apparatus generates notifications for a user. The notifications can be associated with one or more of the following calls, emails, SMS messages, MMS messages, alarms or any other communication event.

In accordance with an embodiment there is a mobile phone comprising the above mentioned apparatus.

In accordance with an embodiment there is an apparatus comprising: means for determining a distance to the object based on the received sound signal reflected from an object; means for determining surroundings based on the determined distance; and means for modifying one or more attributes of an electronic device based on the determined surroundings.

In accordance with an embodiment there is an apparatus comprising at least one processor and at least one memory including computer code, the at least one memory and the computer code configured to with the at least one processor cause the apparatus to at least perform: determine a distance to the object based on the received sound signal reflected from an object; determine surroundings based on the determined distance; and modify one or more attributes of an electronic device based on the determined surroundings.

Various other aspects and further embodiments are also described in the following detailed description and in the attached claims.

BRIEF DESCRIPTION OF THE DRAWINGS

For a better understanding of the present application and as to how the same may be carried into effect, reference will now be made by way of example to the accompanying drawings in which.

DETAILED DESCRIPTION

The following describes apparatus and methods for echolocation for an electronic device for determining the surroundings of the electronic device.

Figure 1:
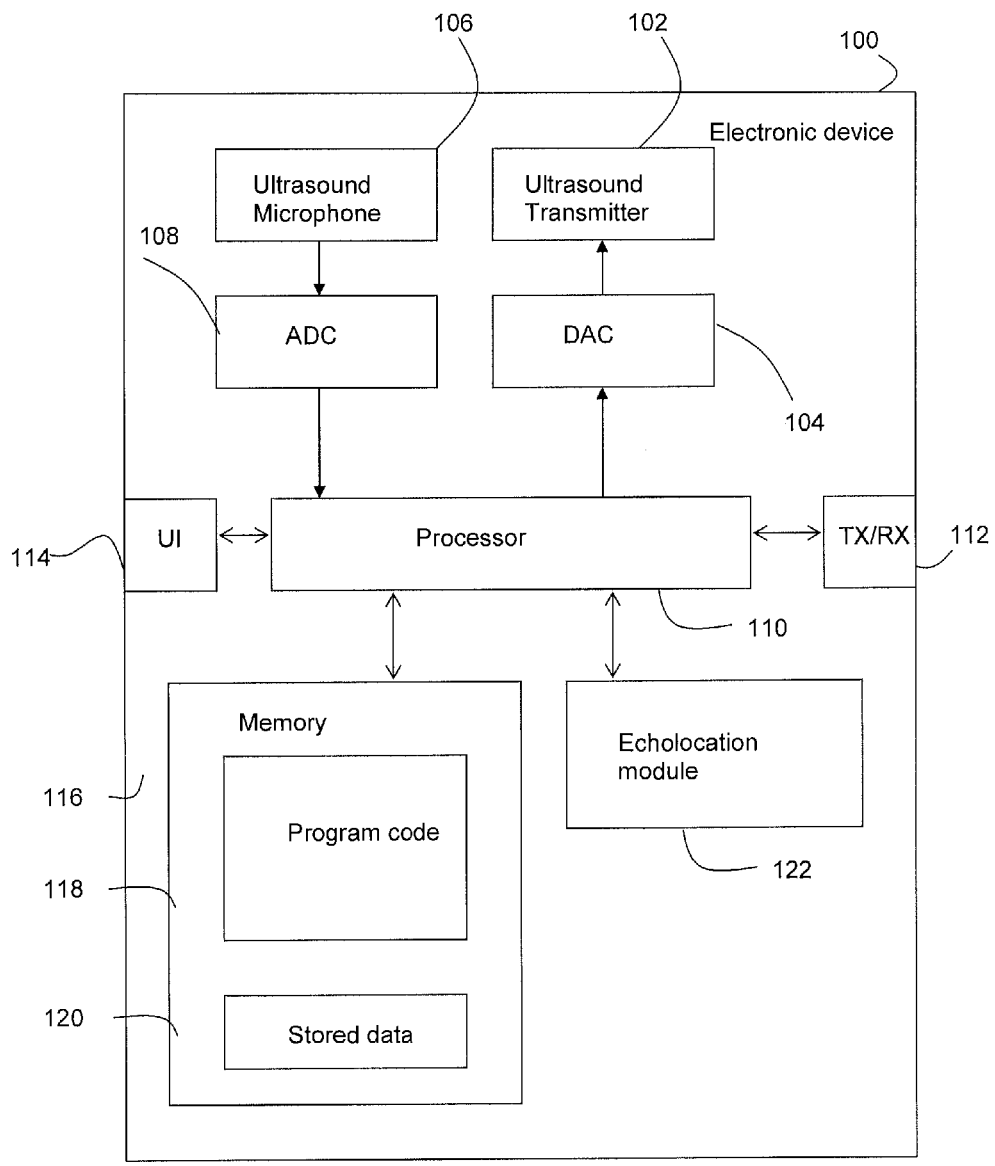
FIG. 1 illustrates a schematic block diagram of an electronic device comprising an echolocation apparatus according to some embodiments.

In this regard reference is made to FIG. 1 which discloses a schematic block diagram of an example electronic device 100 or apparatus suitable for employing embodiments of the application. The electronic device 100 is configured to perform echolocation for determining the surroundings of the electronic device 100.

The electronic device 100 is in some embodiments a mobile device, e.g. a mobile terminal, a mobile phone or user equipment for operation in a wireless communication system. In other embodiments, the electronic device 100 is a personal computer, a laptop, a smartphone, personal digital assistant (PDA), or any other electronic device 100 suitable for audio communication with another device.

In other embodiments, the electronic device 100 is any suitable electronic device 100 configured to generate sound, such as for example a digital camera, a portable audio player (mp3 player), a portable video player (mp4 player). In other embodiments the apparatus may be any suitable electronic device with a speaker configured to generate sound.

The electronic device 100 comprises a transducer or an sound transmitter 102 connected to a digital to analogue converter (DAC) 104 and another transducer or an sound microphone 106 connected to an analogue to digital converter (ADC) 108 which is connected to a processor 110. The processor 110 is connected to a transceiver (TX/RX) 112 via an encoder/decoder (not shown), to a user interface (UI) 114 and to memory 116. The electronic device 100 can send and receive signals via the transceiver 112 to and from another electronic device. The transmitter 102 may be an integrated speaker such as an integrated hands free speaker (IHF), loudspeaker or an earpiece.

The transmitter 102 may be a dynamic or moving coil, a piezoelectric transducer, an electrostatic transducer or a transducer array comprising microelectromechanical systems (MEMS). Additionally or alternatively the transducer comprises a multifunction device (MFD) component having any of the following; combined earpiece, integrated hands-free speaker, vibration generation means or a combination thereof.

The user interface 114 may enable a user to input commands or data to the electronic device 100. Any suitable input technology may be employed by the electronic device 100. It would be understood, for example, the apparatus in some embodiments may employ at least one of a keypad, keyboard, mouse, trackball, touch screen, joystick and wireless controller to provide inputs to the electronic device 100.

The digital to analogue converter (DAC) 104 and the analogue to digital converter (ADC) 108 may be any suitable converters. The DAC 104 can send an electronic sound signal output to the sound transmitter 102 and on receiving the sound signal from the DAC 104, the sound transmitter 102 can generate acoustic waves. The sound microphone 106 can detect acoustic waves and generate a sound signal which is sent to the processor 110 via the ADC 108.

The processor 110 in some embodiments can be configured to execute various program codes. For example, the implemented program code can comprise a code for sound signal processing or configuration. The implemented program codes in some embodiments further comprise additional code for estimating background noise of audio speech signals. The implemented program codes can in some embodiments be stored, for example, in the memory 116 and specifically in a program code section 118 of the memory 116 for retrieval by the processor 110 whenever needed. The memory 116 in some embodiments can further provide a section 120 for storing data, for example, data that has been processed in accordance with the application. The code may, in some embodiments, be implemented at least partially in hardware or firmware.

The electronic device 100 can comprise an echolocation module 122 or any suitable means for determining distance of objects from the electronic device 100 from a sound signal. The echolocation module 122 can be connected to the processor 110. In some embodiments the echolocation module 122 can be replaced with the processor 110 which can carry out the echolocation processing operations. The echolocation module 122 in some embodiments can be an application specific integrated circuit.

Figure 2:
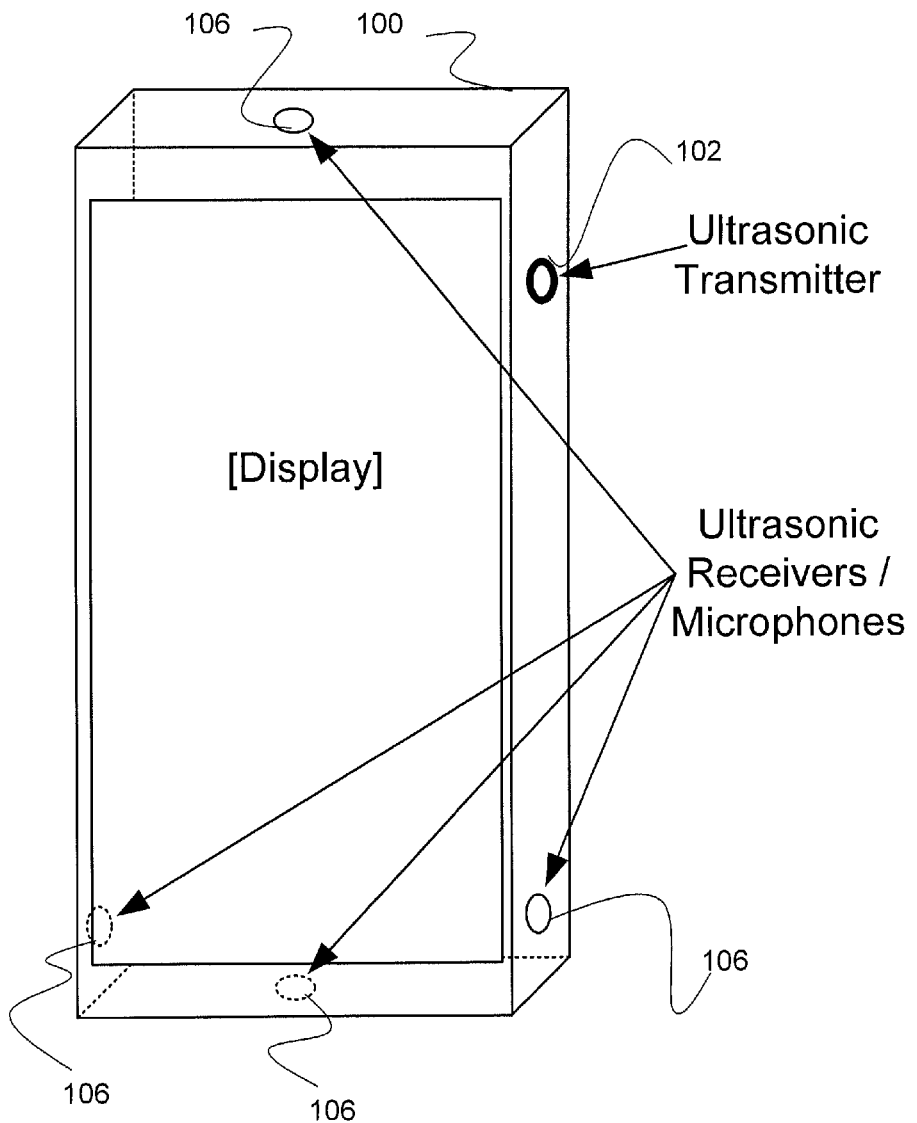
FIG. 2 illustrates a schematic perspective view of an electronic device comprising a transmitter/receiver arrangement for echolocation according to some embodiments.

Some embodiments will now be described in reference to FIG. 2. FIG. 2 illustrates a schematic perspective view of an electronic device 100 comprising a transmitter and receiver arrangement for echolocation.

In some embodiments the electronic device 100 comprises one or more ultrasonic transmitters 102 and one or more ultrasonic receivers 106 for performing echolocation for determining the distance of the electronic device 100 from one or more objects. In some embodiments the ultrasonic transmitter 102 and the ultrasonic receiver may be the same audio transmitter and audio receiver arrangement used for generating and detecting audible sound frequencies. That is, the ultrasonic transmitter 102 may be configured to generate sound signal in an ultrasound range and a sound signal in the audible range. Similarly the ultrasonic receivers 106 can be configured to receive a sound signal in an ultrasound range as well as an audio signal in an audible range. In some embodiments the ultrasonic transmitter 102 is configured to generate a sound signal of a frequency above 20 KHz. Similarly the ultrasonic receiver 106 is configured to detect a sound signal with a frequency above 20 KHz.

FIG. 2 illustrates the arrangement of ultrasonic transmitters and receivers 102, 106 distributed across the electronic device 100. The ultrasonic transmitter 102 can be located in alignment with a hole in the body 200 of the electronic device 100. A plurality of ultrasonic transmitters 102 can be located on a plurality of faces of the electronic device 100. For example, in some embodiments the electronic device can comprise six faces, one of which comprises a display. The ultrasonic transmitters 102 can be aligned with a hole in each face of the electronic device 100. For example, if the electronic device comprises six sides in a box-type shape the ultrasonic transmitters 102 can send an ultrasonic signal in six different directions. In some embodiments the ultrasonic transmitter 102 is not located on the same surface as the display.

In some embodiments there can be the same number of ultrasonic receivers 106 as there are ultrasonic transmitters.

In this way, each surface can comprise an ultrasonic transmitter 102 and an ultrasonic receiver 106.

In other embodiments, the electronic device 100 can comprise a single ultrasonic transmitter 102 and a plurality of ultrasonic receivers 106. The body 200 of the electronic device can comprise a cavity adjacent to the ultrasonic transmitter 102 which is tuned to the ultrasonic frequency range. The cavity within the electronic device 100 can be arranged to direct an ultrasonic signal from the ultrasonic transmitter 102 to a plurality of holes in difference surfaces device 100. In this way, one ultrasonic transmitter 102 can be used to provide a plurality of ultrasonic beams in a plurality of directions. Similarly an ultrasonic receiver 106 can be located next to each of the ultrasonic output holes.

In some embodiments the electronic device 100 can comprise an opening having an adjustable size. The adjustable opening can be varied in order to tune the acoustics properties to ultrasound and audio frequencies depending on whether an ultrasound signal or an audio signal is to be generated. The processor 110 can control the size of the adjustable opening. In some embodiments the body 200 comprises an electrically controllable material or mechanism to adjust the size of the opening. In some embodiments an electroactive polymer or electrically controllable flaps are used to adjust the size of the opening.

Alternatively, the electronic device 100 comprises a single ultrasonic transmitter which transmits a wide beam ultrasonic signal from single surface. In this way, the wide beam ultrasonic signal is transmitted from a single surface.

In an alternative embodiment there can be one or more ultrasonic transducers which can transmit and receive ultrasonic signals. In this way, an ultrasonic transducer of the electronic device 100 can be configured to operate in two modes; transmitting an ultrasonic signal and receiving an ultrasonic signal. The ultrasonic transducer can transmit a pulse of an ultrasonic signal in the first mode then switch to a second mode for listening to the echo of the ultrasonic pulse. In some embodiments one or more ultrasonic transducers capable of sending and receiving an ultrasonic signal can be located on one or more surfaces of the electronic device 100.

In some embodiments the echolocation is performed using separate ultrasonic transmitters 102 and ultrasonic receivers 106. In some other embodiments an audible sound can be used to perform echolocation. For example a high frequency audible audio signal can be used for echolocation. In some embodiments an ultrasound signal is used to perform echolocation because the ultrasound signal does not interfere with other audio signals generated by the electronic device 100 for example, a phone call. Furthermore an ultrasound signal can provide better resolution when using echolocation for detecting objects.

Figure 3:
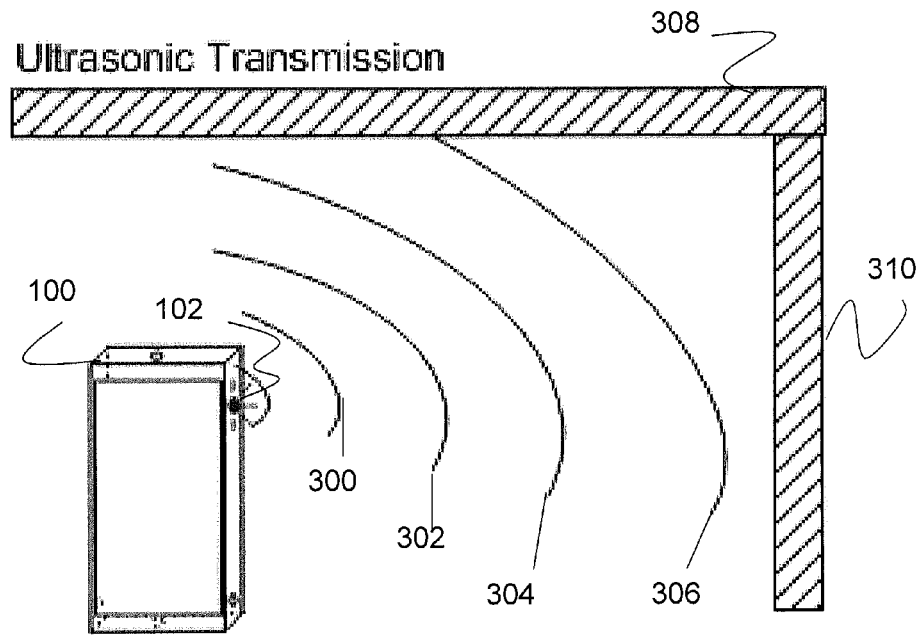
FIGS. 3 and 4 illustrate echolocation being performed by an electronic device according to some embodiments.
Figure 4:
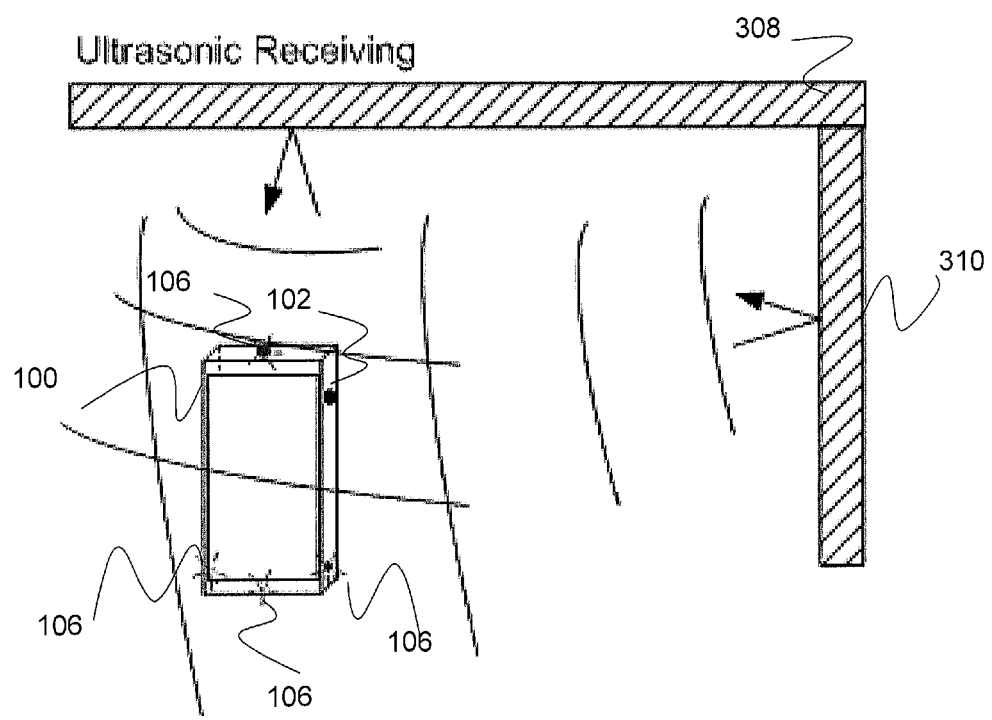

The process of echolocation will now be described using FIGS. 3 and 4. FIGS. 3 and 4 illustrate echolocation being performed by the electronic device 100.

In a first mode the transmitter 102 sends an ultrasonic signal 300. In some embodiments the ultrasonic signal is sent in a series of pulses 302, 304, 306. The ultrasonic signal can be directed towards one or more objects using a beam forming process. In some embodiments the ultrasonic signal is beam formed using an opening in the body 200 of the electronic device 100 aligned with the ultrasonic transmitter 102. In other embodiments the ultrasonic transmitter 102 can be arranged to transmit an ultrasonic signal over a wide area. In this way FIG. 3 shows a series of pulses 300, 302, 304 and 306 which propagate towards objects 308, 310. In this case, the objects 308, 310 are walls, but the objects can be any object which can reflect the ultrasound signal.

FIG. 4 shows the electronic device 100 operating in a second mode. In the second mode the ultrasonic receivers 106 listen for one or more reflected ultrasonic signals from the objects 308, 310. In some embodiments the electronic device 100 does not operate in both the first and second modes at the same time. Since the electronic device 100 has a transmitting mode and a receiving mode the ultrasonic transmissions from the ultrasonic transmitter 102 do not interfere with the ultrasonic receivers 106 listening for the reflected ultrasonic echoes.

The distance from the electronic device 100 to the objects 308, 310 can be determined from the time lapse between the ultrasound transmitter 102 sending an ultrasound pulse and the ultrasound receiver 106 receiving the same ultrasound pulse. This time difference is the time for the ultrasound pulse to travel to the object 308, 310 and then return from the object 308, 310 to the electronic device 100. In this way half the time delay between transmitting the ultrasound signal and receiving the ultrasound signal multiplied by the speed of sound in air is the distance of the electronic device 100 from the object 308, 310.

In some embodiments the electronic device 100 can perform an additional distance determination step. After the electronic device 100 has determined the distance, the processor 110 can initiate the ultrasound transmitter 102 to generate a continuous ultrasound signal. The ultrasound transmitter 102 can set up a standing wave between the electronic device 100 and the object 308, 310. The echolocation module can them compare the received ultrasound signal with the transmitted signal and determine the phase difference between the two.

The echolocation module 122 can then more accurately determine the distance based on the phase difference, than timing the length of time an ultrasonic pulse takes to propagate to and from an object.

Figure 5:
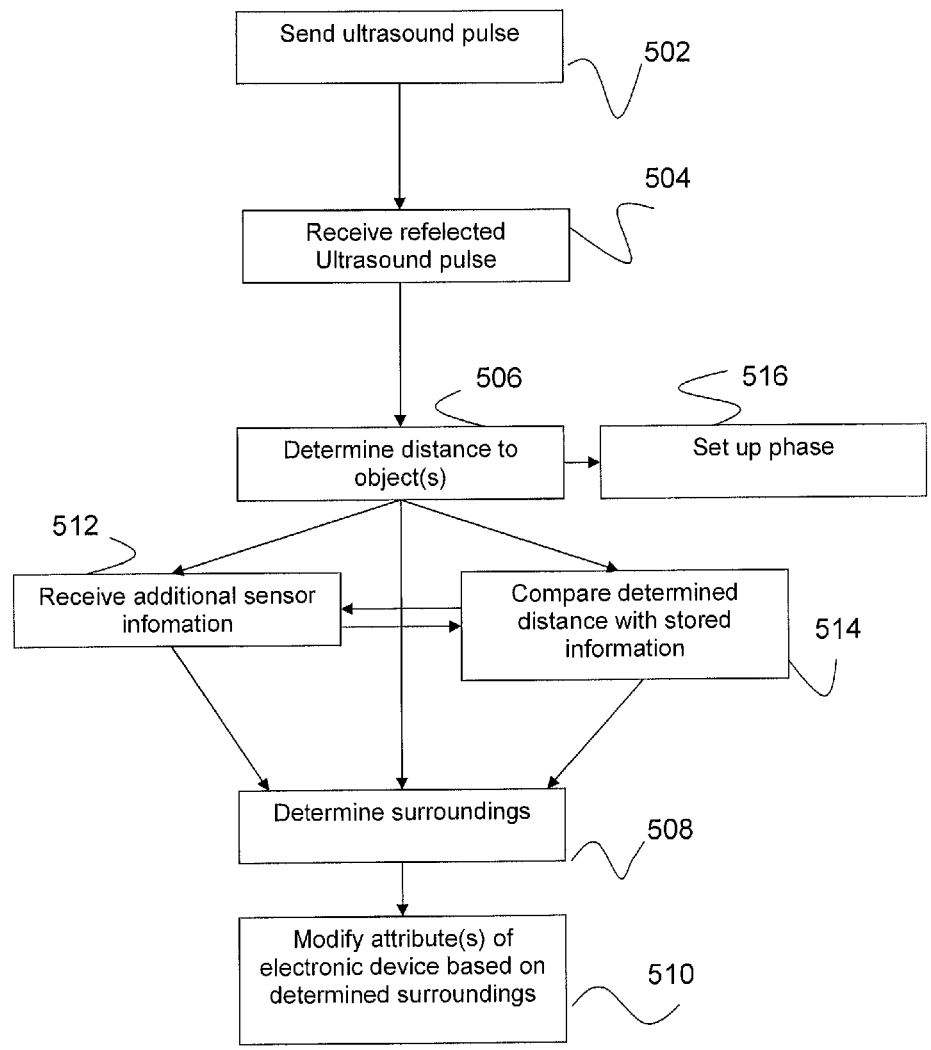
FIG. 5 illustrates a flow diagram of an echolocation method according to some embodiments.

Some detailed embodiments will now be described with reference to FIG. 5. FIG. 5 discloses a method for performing echolocation at an electronic device 100.

The ultrasound transmitter 102 sends an ultrasound pulse at a first time as shown in block 502 as discussed in reference to FIG. 3. The ultrasound pulse propagates from the electronic device 100 and is incident on a nearby object 308, 310. Depending on the shape, orientation, structure and material of the object 308, 310 the ultrasound pulse is reflected by the object 308, 310. Usually the object reflecting the ultrasound pulse back towards the electronic device 100 has a hard surface such as a wall, window or door of a building or vehicle.

The reflected ultrasound pulse propagates from the object 308, 310 to the electronic device 100. At a second time the ultrasound microphone 106 receives the reflected ultrasound pulse as shown in block 504. In some embodiments the ultrasound transmitter 102 sends an ultrasound pulse when the ultrasound microphone 106 is not listening. This can prevent interference from the ultrasound transmitter 102 at the ultrasound microphone 106.

When the ultrasound signal is incident at the ultrasound microphone the ultrasound microphone 106 is activated and sends an analogue signal representing the ultrasound signal to the analogue to digital converter 108. The analogue to digital converter 108 sends a signal to the processor 110. The processor 110 then sends the ultrasound signal received at the microphone 106 to the echolocation model 122. In addition the processor 110 receives information from the ultrasound transmitter with respect to the time that the received ultrasound signal at the ultrasound microphone 106 was initially transmitted by the ultrasound transmitter 102. The processor 110 sends the timing information to the echolocation module 122.

The echolocation module 122 then initiates the echolocation method according to some embodiments.

The echolocation module 122 then determines the distance to objects 310, 308 according to the following equation (1):

$$D = \frac{\Delta t}{2} \times S \qquad (1)$$

Where D is the distance from the electronic device 100 to the objects 308, 310, Δt is the time lapse between sending the ultrasound pulse and receiving the ultrasound pulse and S is the speed of sound in air.

In some embodiments the echolocation module 122 can determine the distance to objects 308, 310 as shown in block 506 for a plurality of objects. Indeed, in some embodiments there are a plurality of ultrasound microphones 106 located on each surface of the electronic device 100 and the echolocation module 122 can determine the distance to the object for each ultrasound microphone 106.

For example the electronic device 100 can be situated in a room and a plurality of ultrasound pulses can be sent in a plurality of directions towards different walls, windows, ceilings or floors. Thereafter the reflected ultrasound pulses can be received by a plurality of ultrasound microphones 106. In this way the ultrasound microphones 106 can receive a plurality of reflected pulses from different directions. The echolocation module 122 can then determine the distance of the electronic device 100 from each wall, floor and ceiling in the room. In this way the echolocation module 122 can determine spatial location of the electronic device 100 within the room.

In some embodiments the transmitter 102 sends a plurality of ultrasonic pulses reflected back from the objects. The echolocation module 122 can combine the determined distances from a plurality of ultrasonic pulses to provide a more accurate distance determination. In some embodiments the echolocation module 122 takes a mean average of a determined distance of the plurality of ultrasonic pulses.

In some other embodiments a plurality of transmitters can send ultrasonic pulses at difference frequencies. In this way the frequency of the received ultrasonic pulse at an associated microphone can be determined. The echolocation module 122 can then determine that a reflected ultrasonic pulse received at an ultrasonic microphone has been reflected off the intended object. For example, the echolocation module 122 can disregard any received ultrasonic pulse received at a microphone which does not receive a pulse of the correct frequency. In this way the echolocation module can avoid distance errors calculated from secondary echoes reflected off a plurality of objects. Indeed a transmitter and receiver can be associated with a certain frequency of ultrasonic pulse.

The echolocation module 122 can then determine the surroundings based on the determined distance to the objects 308, 310 as shown in step 508.

In some embodiments a single ultrasound transmitter and microphone arrangement is provided. In this way an ultrasound pulse can be sent and received in a single direction. That is the echolocation module can determine the distance of the electronic device 100 to a single surface. For example, the echolocation module 122 can determine that the electronic device 100 is no longer in an open area and is now close to a wall. The echolocation module 122 then sends surrounding information to the processor 110. The processor 110 then initiates modifying attributes of the electronic device 100 based on the determined surrounding information as shown in block 510.

In some embodiments the electronic device 100 is a mobile device and the processor 110 modifies the behaviour of the device once the echolocation 122 has determined the mobile device 100 is close to a wall. In some embodiments the processor 110 can modify the acoustic properties of the phone because the processor 110 knows that the mobile device 100 is close to a wall. In this way, the volume and other associated properties of the audio transducer can be adjusted because the wall may provide shelter for the user. In some embodiments any behaviour or functionality of the phone can be modified in response to the determination to the surroundings of the electronic device 100.

In some further embodiments the echolocation module 122 can optionally receive additional information as shown in block 512. In some embodiments the additional information can be sensor output information from other sensors of the electronic device. For example, the echolocation module 122 can receive location information from a GPS sensor (not shown). In this way, the echolocation module can determine the estimated location of the electronic device 100 from the GPS location information but can further determine the surroundings of the electronic device 100 from both the GPS location information and the determined distance to objects. For example, the echolocation module, can determine that an electronic device 100 is near a building or vehicle from the GPS location information and then determine whether the electronic device 100 is inside or outside a building or vehicle from the determined distance information. In some embodiments the electronic device 100 can be determined from the GPS location information that the electronic device 100 is at the train station. In addition, the echolocation module 122 can determine whether the electronic device is inside or outside the train at a platform of the station. Therefore based on the information the echolocation module can send the determined surrounding information to the processor 110.

The processor 110 can then determine that the electronic device 100 should modify its behaviour whilst the electronic device is located on the train platform. For example, the processor 110 can stop email notifications, instant message notifications and other low priority notifications from being generated whilst the electronic device 100 and hence the user of the electronic device 100 is waiting for the train on the platform. This can prevent the user from being distracted by notifications at an inconvenient time. Modifying the functionality of the electronic device 100 can also prevent other passengers from seeing the notification if they are in close proximity to the electronic device 100. At a later time the echolocation module 122 can determine from the GPS location information and the determined distance information that the electronic device is in the train station but is now located within a train carriage. The processor 110 can then determine that the user wishes to receive notifications and can send notifications to the user within the train carriage. In some embodiments the mobile device 100 can buffer notifications from memory until the determined surroundings meet with criteria with generating notifications. In some embodiments the criteria for generating notification can be modified by the user during a set up phase which is discussed in reference to the embodiments in FIG. 6. The user for example could modify the criteria so that some, none or all notifications are generated by the electronic device 100.

Similarly, the echolocation module 122 can determine from the GPS location information that the electronic device 100 is in transit. For example, the echolocation module 122 can determine that the electronic device is moving with a user at walking pace within a building. The user can set the criteria stored in memory of the electronic device to only generate notifications when the user is not walking but is stationary for a certain period of time.

In other embodiments additionally or alternatively other sensor information can be sent to the echolocation module 122. For example, information concerning acceleration of the electronic device 100 from an accelerometer sensor, can be used. Again the echolocation module can determine from the accelerometer information and the determined distance information whether the electronic device is in a relatively static environment and thus is allowed to receive notifications.

In some embodiments the echolocation module 122 can determine from the GPS information and the ultrasonic information the type of vehicle the user is in. For example, the echolocation module 122 can determine from the GPS information that the electronic device 100 is moving on a road and from the determined distance information from the ultrasonic measurements that the electronic device 100 is in an elongated space. In this way the echolocation module 122 can determine that the electronic device 100 is moving along a road in a long vehicle such as a bus. The processor 100 from this information can know that the user is not driving the vehicle and can adjust the functionality such as allowing sending notifications to the user.

In some embodiments, the echolocation module 122 can determine the level of attenuation between the transmitted ultrasound pulse and the received reflected ultrasound pulse. Depending on the level of attenuation of the received reflected pulse, the echolocation module 122 can determine whether the object 308, 310 comprises a hard or soft surface. In this way, the echolocation module 122 can tell the difference between seats of a vehicle and other harder objects. In some embodiments, the echolocation module 122 can perform an additional step of determining the type of material near the electronic device 100 after the distance determination has been made in order to verify that the electronic device 100 and the user are in a particular environment, such as on a train or a bus.

In additional or alternative embodiments other information can be sent to the echolocation module 122. Indeed one or more of the following can be used by the echolocation module data usage, call usage, compass information, gyroscope information, brightness information from a light sensor, information received by wireless network/connection, information received by near field communication, battery level, signal level or any other sensor information of the electronic device 100 or sensor information received by the electronic device 100.

In some embodiments, the echolocation module 122 can perform error correction on the ultrasonic distance determination. The ultrasonic detection can be disturbed if the electronic device 100 is constantly moving, rotating, vibrating etc. The echolocation module 122 can receive data from other sensors such as gyroscope, and/or accelerometers which can be used to cancel the inaccuracy caused by movement of the electronic device 100. In this way the echolocation module 122 can be configured to compensate for the changes in the time it takes for the sound to reach the surfaces of objects 308, 310 and return to the electronic device's ultrasonic receivers 106 due to the movement of the electronic device 100.

Optionally, the echolocation module 122 can compare determined distance information with stored information as shown in block 514. In this way, the echolocation module 122 can retrieve from memory a list of preferred locations for modifying the functionality of the electronic device 100. For example the processor 100 can determine that the functionality of the electronic device 100 is modified if the electronic device is in a room of a certain size. In some embodiments, the echolocation module 122 can recognise preferred rooms for modifying the electronic device 100 based on the determined distance and, for example, the GPS location information.

In some embodiments the electronic device 100 can be set up to be trained to determine when the electronic device is to be modified. The set up phase is shown in FIG. 5 as block 516.

Figure 6:
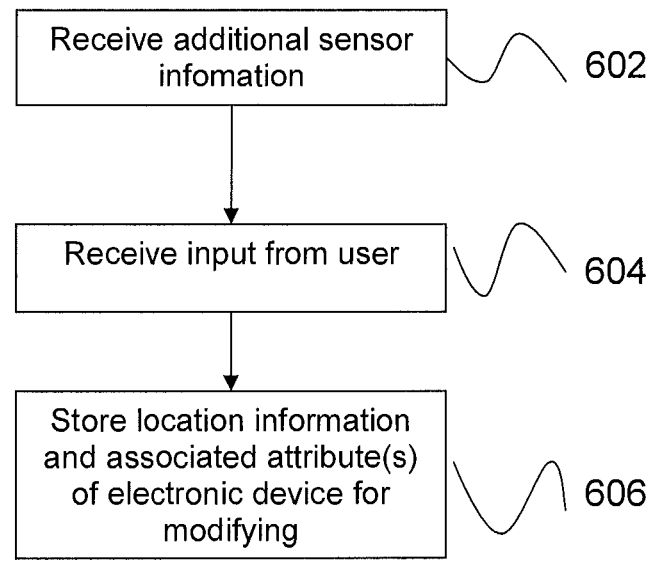
FIG. 6 illustrates a flow diagram of an echolocation method according to some other embodiments.

The set up phase of the electronic device 100 will now be discussed with reference to FIG. 6. FIG. 6 discloses a method according to some embodiments of setting up the electronic device 100.

When the electronic device 100 is being trained to recognise locations the electronic device will perform steps 502, 504 and 506 as shown in FIG. 5. That is, the echolocation module 122 determines the distance to nearby objects 308, 310 of the electronic device 100. For example the electronic device 100 can be in a room and the echolocation module 122 has determined the distance to the walls.

The echolocation module 122 can then optionally receive additional sensor information as required in step 602. Similar to the method shown in FIG. 5 the additional sensor information can be information from a sensor of the electronic device 100. For example in some embodiments the additional sensor information can be information regarding location retrieved from a GPS sensor. In some embodiments the echolocation module 122 receives information of the determined distance and the additional sensor information for storing in memory of the electronic device 100. The processor 110 can then receive input from a user regarding how the electronic device is to be modified when the electronic device determines that the determined distance information and additional sensor information are the same. In some alternative embodiments the user does not input information as to how the electronic device is to be modified. Instead, the electronic device 100 can be pre-programmed to react to certain criteria.

The input is received from the user as shown in step 604. In some embodiments the input from a user can be the user selecting an operation from a list on a display of the electronic device 100. For example a user can select "notifications only on the train or at the office". In this way, as discussed previously, the user will only see notifications generated by the electronic device 100 when the echolocation module determines that the electronic device 100 is on a train or at the office. The processor 110 then stores the location information and the associated attributes for modifying the mobile device in memory 116 as shown in step 606. In this way the electronic device 100 knows what action to take when the electronic device is in different places.

In some embodiments the ultrasound transmitter 102 is not integrated with the electronic device 100. Instead the ultrasound transmitter 102 can be located in a headset. In this way the ultrasound transmitter can be arranged to send a pulse to nearby objects when the headset with the ultrasound transmitter 102 is being used. Of course, in some embodiments the headset does not need to be in use by a user for an ultrasound transmitter 102 located thereon to transmit an ultrasonic pulse to a nearby object. At the same time, the ultrasound transmitter 102 is configured to send timing information to the processor 110.

In another embodiment the electronic device 100 can be taught to block all or some messages and call notifications when the user is sleeping. For example, the processor 100 can be instructed to only allow important calls and/or clock alarm to sound when the user is at home in a bedroom and the electronic device 100 is stationary. Optionally the processor 100 can determine whether to modify the message and call notifications based on whether there is movement, for example people walking nearby the electronic device 100. In some embodiments the echolocation module 122 determines that the user is at home from the GPS information and/or the ultrasound determined distance the echolocation module 122 determines that the user is in a bedroom from the ultrasound determined distance.

In some other embodiments the electronic device 100 can be used in an environment where the user is visually impaired, for example the environment may be dark, smoke filled or the user themselves may be visually impaired. The electronic device may use the determined distance information from the ultrasound signal to determine the surroundings of the electronic device 100. The processor 110 can compare the determined surroundings of the electronic device 100 with previously determined or stored surroundings information. In this way the processor 110 can provide navigation information to the user of the electronic device 100 based on the comparison. In some embodiments the electronic device can determine the location of an exit of a building based on determined transition information. For example, the processor 110 can determine that the electronic device has entered a building from GPS information and ultrasound signals. The processor 110 can automatically determine the exit of the building for future reference of the electronic device 100. Furthermore, the electronic device 100 can navigate to a previously stored location, for example a waypoint, in a building.

In some embodiments similar navigation can be used to navigate the user to their car in car park. For example, the car park can be an underground car park where GPS location information is not available. The processor 110 can determine from the output of the echolocation module 122 based on ultrasound distance determination, gyroscope information and/or accelerometer information navigation instructions for directing a user to the parked car.

In some further embodiments, the electronic device 100 can comprise a near field communication (NFC) sensor (not shown) and receive data via the NFC sensor. In some embodiments the electronic device 100 can receive data from radio frequency NFC tags at the entrances of buildings such as department stores and hotel. The data can comprise information of the layout of the building. This means when the electronic device 100 enters a building, the electronic device can receive layout information of the building. Alternatively, the electronic device 100 can receive the layout information via any other suitable communication means, for example over a wireless network. The layout information can then be stored in memory 116 for indoor navigation or emergencies as discussed in reference to previous embodiments.

In some other embodiments the processor 110 can determine from the output of the echolocation module 122 that the electronic device 100 is in a pocket or a bag. The echolocation module 122 can determine from the ultrasonic distance determination that the distance from the electronic device 100 that the electronic device 100 is in very close proximity to an object. The echolocation module 122 can determine that the electronic device 100 is within another object, for example a pocket or a bag or case if the echolocation module determines that the electronic device is in very close proximity to object in more than one direction. The echolocation module 122 can send a signal to the processor 110 and the processor 110 can modifies the functionality of the electronic device 100. For example, the processor 110, having determined the electronic device 100 is in a bag, can adjust the volume of the device so that the user is more likely to hear the electronic device 100. Additionally, the echolocation module 122 can receive additional sensor information from temperature sensors and/or accelerometers to indicate that the electronic device 100 is in a pocket or a bag.

Alternatively, or additionally the processor 110 can receive information from temperature sensors and/or accelerometers and the processor 110 can determine that the electronic device 100 is in a pocket. The processor 110 can then instruct the echolocation module 122 to stop or reduce ultrasound distance determination process in order to save battery resources.

In some further alternative embodiments the processor 110 can determine from a plurality of output signals of the ultrasound determined distance received from the echolocation module 122 that the distance to the object 308, 310 is changing. This means that the processor 110 can determine that the object 308, 310 is moving. In some embodiments the processor 110 can detect movement and optionally generate an alarm if movement is detected. In this way the processor can detect intruders in a room where the user is sleeping and generate an alarm to wake the user.

It shall be appreciated that the term electronic device and user equipment is intended to cover any suitable type of wireless user equipment, such as mobile telephones, portable data processing devices or portable web browsers.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the embodiments are not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits (such as field programmable gate array—FPGA circuits) and processors based on multi-core processor architecture, as non-limiting examples.

Embodiments may be practiced in various components such as integrated circuit modules. The design of PWB and RF designs are by and large a highly automated process. Complex and powerful software tools are available for converting a design into a Printed Wired Board design ready to be etched and formed on a substrate.

Programs automatically route conductors and locate components on a substrate using well established rules of design as well as libraries of pre-stored design modules. Once the design for a substrate or circuit has been completed, the resultant design, in a standardized electronic format may be transmitted to a fabrication facility or for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as:
(i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this application. However, various modifications and adaptations may become apparent to those skilled in the relevant arts in view of the foregoing description, when read in conjunction with the accompanying drawings and the appended claims. However, all such and similar modifications of the teachings of this application will still fall within the scope of this application as defined in the appended claims.

Indeed in there is a further embodiment comprising a combination of one or more of any of the other embodiments previously discussed.

The invention claimed is:
1. An apparatus comprising:
a sound generator configured to generate a sound signal in an ultrasound range;
an echolocation module configured to receive the sound signal reflected from an object so as to determine a distance;
one or more additional sensors configured to provide an additional sensor information to the echolocation module;
the echolocation module further configured to determine a surrounding information based on the additional sensor information and the sound signal reflected from the object; and
a processor configured to modify behavior or functionality associated with acoustic properties of the apparatus based on the determined surrounding information.

2. The apparatus according to claim 1, wherein the sound generator is configured to operate in a first mode for generating audible sounds and in a second mode for generating ultrasonic sounds; and
a sound detector configured to detect audible sounds in the first mode and ultrasonic sounds in the second mode.

3. The apparatus according to claim 2, wherein the first and second modes occur at the same time or at different time.

4. The apparatus according to claim 1, wherein the echolocation module is configured to determine a distance to the object so as to provide the surrounding information based on the received sound signal.

5. The apparatus according to claim 1, wherein the apparatus comprises one or more acoustic transducers configured to send the sound signal towards the object and one or more acoustic transducers configured to receive the sound signal reflected from the object.

6. The apparatus according claim 5, wherein the one or more acoustic transducers are configured to send and receive an ultrasonic signal.

7. The apparatus according to claim 1, wherein the apparatus comprises one or more sensors configured to send information to the echolocation module and the echolocation module operates based on the received sensor information.

8. The apparatus according to claim 7, wherein the one or more sensors comprises at least one of: global positioning system sensor; temperature sensor, power signal sensor, battery signal sensor, acceleration sensor, vibration sensor, brightness sensor, data usage sensor, call usage sensor, compass sensor, gyroscopic sensor, near field communication sensor or any other sensor.

9. The apparatus according to claim 4, wherein the echolocation module is configured to compare the determined distance information with distance information stored in a memory of the apparatus.

10. The apparatus according to claim 9, wherein the echolocation module is configured to determine that the determined distance information matches with the stored distance information and retrieve the surrounding information associated with the stored distance information.

11. The apparatus according to claim 1, wherein the apparatus comprises a plurality of acoustic transducers for receiving and sending sound signals to a plurality of objects.

12. The apparatus according to claim 1, wherein the apparatus generates an associated notification based on the modified one or more attributes.

13. The apparatus according to claim 1, wherein the echolocation module receives information from a headset and the headset comprises one or more transducers configured to send an ultrasonic signal to the object.

14. A method comprising:
generating a sound signal in an ultrasound range;
determining a distance based on the sound signal reflected from an object;
providing an additional sensor information;
determining a surrounding information based on the additional sensor information and the sound signal reflected from the object; and
modifying behavior or functionality associated with acoustic properties of an apparatus based on the determined surrounding information.

15. The method according to claim 14, wherein the method further comprises sending the sound signal towards the object.

16. The method according to claim 14, wherein determining the surrounding information comprises determining a distance to the object based on the received sound signal.

17. The method according to claim 14, wherein the method further comprises receiving one or more sensor information and determining the surrounding information associated with the received one or more sensor information.

18. The method according to claim 14, wherein modifying the behavior or functionality of the apparatus comprises generating an associated notification.

19. The apparatus according to claim 1, wherein the processor is further configured to:
generate a continuous ultrasound signal; and
compare a received ultrasound signal from the generated continuous sound signal with a transmitted ultrasound signal from the generated continuous sound signal so as to further determine the surrounding information based on a phase difference between the received ultrasound signal and the transmitted sound signal.

20. The method according to claim 14, further comprising:
generating a continuous ultrasound signal; and
comparing a received ultrasound signal from the generated continuous sound signal with a transmitted ultrasound signal from the generated continuous sound signal so as to further determine the surrounding information based on a phase difference between the received ultrasound signal and the transmitted sound signal.

21. An apparatus comprising:
at least one processor and
at least one memory including computer code, the at least one memory and the computer code configured to with the at least one processor cause the apparatus to at least:
generate a sound signal in an ultrasound range;
determine a distance based on the sound signal reflected from an object;
provide an additional sensor information;
determine a surrounding information based on the additional sensor information and the sound signal reflected from the object; and
modify behavior or functionality associated with acoustic properties of the apparatus based on the determined surrounding information.

22. The apparatus according to claim 1, wherein to modify behavior or functionality associated with acoustic properties of the apparatus based on the determined surrounding information comprises adjusting volume and other associated properties of one or more acoustic transducers.

* * * * *